United States Patent [19]

Levene

[11] 4,088,867
[45] May 9, 1978

[54] CREATING A CLOSED IMAGE FROM SEGMENTS

[75] Inventor: Martin Lewis Levene, Cherry Hill, N.J.

[73] Assignee: RCA Corporation, New York, N.Y.

[21] Appl. No.: 727,658

[22] Filed: Sep. 29, 1976

[51] Int. Cl.² .............................................. H05B 1/00
[52] U.S. Cl. ................................... 219/216; 219/388; 346/76 R
[58] Field of Search ............. 219/216, 388; 346/76 R; 432/59, 60, 227, 228; 355/3 FU; 250/317-319

[56] References Cited
U.S. PATENT DOCUMENTS 3,632,969  1/1972  Walkow .............................. 219/216

Primary Examiner—C. L. Albritton
Attorney, Agent, or Firm—H. Christoffersen; Joseph D. Lazar; Raymond E. Smiley

[57] ABSTRACT

An electrode assembly is formed of two opposed groups of concentric selectively addressable electrodes positioned opposite a record medium. The electrode assembly is first positioned relative to the medium to produce thereon an incomplete image from an electrode of one group. Thereafter the electrode assembly is moved to a second position relative to the medium to produce the remaining portion of the selected image creating one closed image.

10 Claims, 6 Drawing Figures

CREATING A CLOSED IMAGE FROM SEGMENTS

The invention herein described was made in the course of or under a contract with the U.S. Postal Service.

BACKGROUND OF THE INVENTION

Many methods and apparatus exist for generating an image on a record medium such as for example applying heated electrodes to temperature sensitive paper, projecting light in a desired shape on light sensitive paper, or applying a charge pattern to a paper designed to retain such charge. These techniques have inherent problems when selectively addressable symbols enclosed by other symbols are involved.

For example, U.S. Pat. No. 3,736,406, issued May 29, 1973 to Vossen et al. and assigned to the common assignee, illustrates a thermographic print head with selectable (heatable) concentric circular electrodes on an electrically insulated substrate, and a heat sensitive paper. An inner circle is selected by applying power thereto over conductors which, of necessity, cross outer circular electrodes. The conductors may be designed to produce no heat in and of themselves but have been found in practice to undesirably conduct heat away from any heated electrodes over which they pass, creating voids in the circular rings appearing on the heat sensitive paper. If the conductors are heated to overcome the problem of voids they then create undesired radial lines. Similarly with photographic techniques some sort of mask must be provided which has inner addressable segments, the addressing means for which must cross outer segments without themselves causing undesired marks to appear on the record medium. Likewise with apparatus for applying a charge pattern there is a problem in applying to an inner symbol enclosed by an outer closed symbol without undesirably altering the charge pattern on the outer symbol.

SUMMARY OF THE INVENTION

In accordance with the present invention apparatus for forming an image on a record medium which is of the type that is responsive to stimulating elements for forming images thereon comprises a first and second group of a plurality of selectable stimulating elements. Each group is disposed on a separate portion of a support means. Means are provided for serially positioning the first and second groups of elements into working relationship relative to the record medium. Means are provided for selectively stimulating one or more of said stimulating elements in each group.

BRIEF DESCRIPTION OF THE DRAWING

FIGS. 3a, 3b and 3c are three sequentially timespaced plan views of the electrode assembly of FIG. 2 in operation in the apparatus of FIG. 1.

DETAILED DESCRIPTION OF A PREFERRED EMBODIMENT

Figure 1:
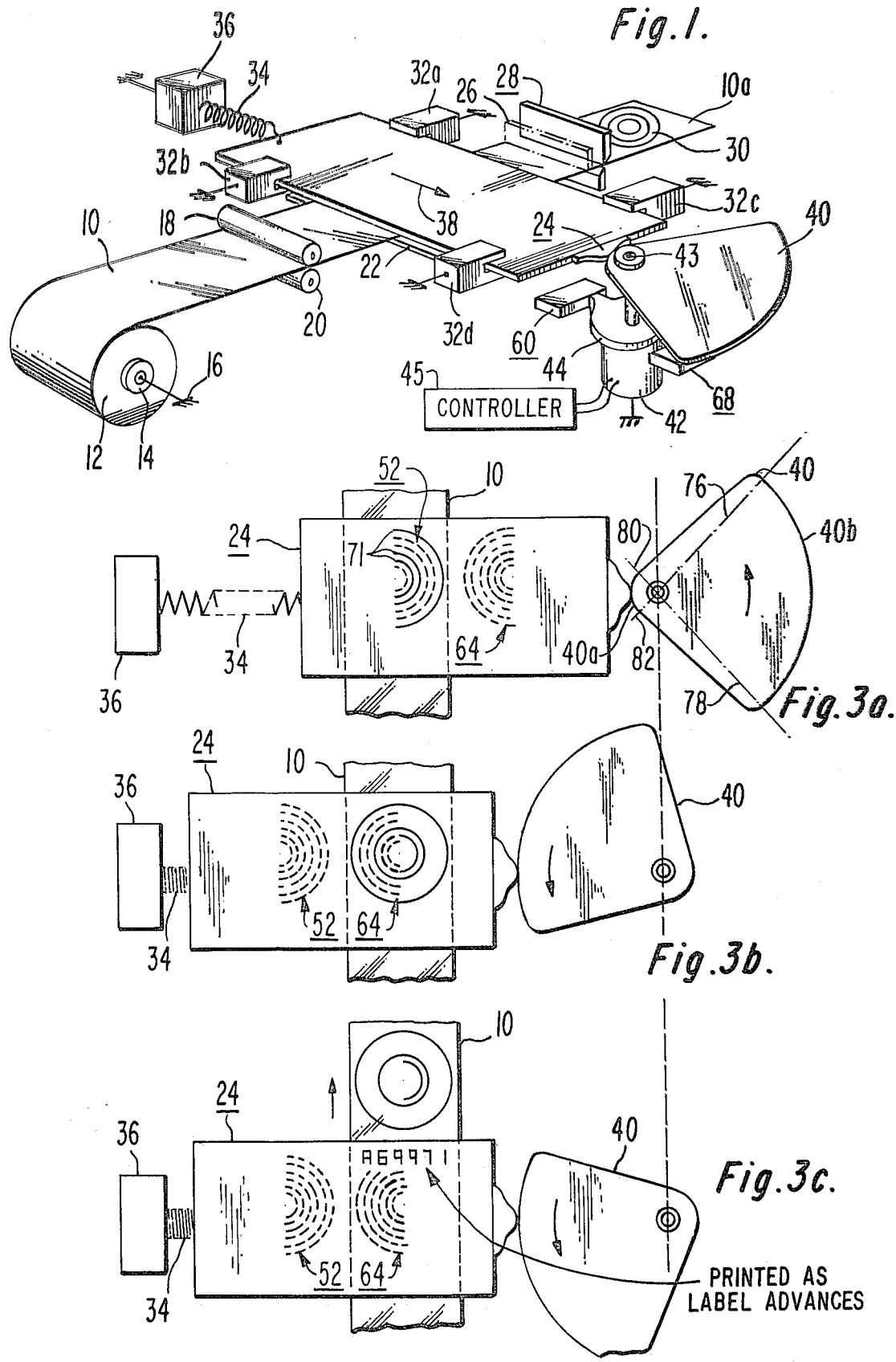
FIG. 1 is a perspective view of a label image producing apparatus in accordance with the invention.

Referring to FIG. 1 a label producing apparatus in accordance with the invention is illustrated in perspective. In particular the apparatus creates labels by the application of heat to a heat sensitive record medium. A record medium 10 extends from a roll 12 thereof. Roll 12 is rotatably held on a shaft 14 permitting the record medium 10 to be unwound therefrom. The symbol 16 on shaft 14 and various other elements to be described indicates that those elements are fixedly connected to a base plate (not shown). Record medium 10 first passes between a pair of drive rollers 18, 20 for purposes of unwinding a portion of record medium 10 upon command.

Record medium 10 then passes between a backing plate 22, and an electrode assembly means 24 to be described in detail in connection with the description of FIG. 2. Electrode assembly 24 causes an image to be created on record medium 10. Backing plate 22 is arranged to provide pressure upon medium 10 while the record medium is heated by electrode assembly 24.

The record medium next passes a "development station" 26 illustrated in phantom. The nature of the development station will depend on the type of record medium 10 and the type of electrode assembly 24. By way of example, if record medium 10 is light sensitive paper and electrode assembly 24 contains electrodes which are controlled to illuminate record medium 10, then development station 26 contains appropriate developing and fixing chemicals and drying means. As a second example, if record medium 10 is paper capable of holding a charge pattern and electrode assembly 24 contains electrodes which apply appropriate charge patterns thereto, development station 26 contains appropriate toning and fixing equipment. With temperature sensitive record medium 10, development station 26 is unnecessary.

Record medium 10 next passes a cutting bar assembly 28 the purpose of which is to cut a portion 10a of record medium 10. Portion 10a contains a completed image such as a concentric circular image 30. Portion 10a once cut may be applied to any item to be labeled thereby.

Returning to electrode assembly 24 for a more detailed description thereof, it is seen that the assembly is arranged to be slideably mounted in fixed guides or channels 32a, 32b, 32c and 32d hereinafter generally referred to as guides 32. A compression spring 34 extending between a fixed block 36 and electrode assembly 24 resiliently urges the electrode assembly in the direction of arrow 38. The lateral position of electrode assembly 24 is controlled by a cam 40 which is connected to a rotatable drive means 42 to be rotated about a point 43. Cam 40 is formed of two oppositely disposed sectors 40a and 40b (as outlined in FIG. 3a) defined respectively by radii 76, 78 and 80, 82. A second cam 44 is also connected to drive means 42 to control electrical signals in the system to be described shortly in connection with a description of FIG. 2. A controller 45 is coupled to drive means 42 to provide drive signals therefore for controlling the rotational position of cams 40 and 44.

Figure 2:
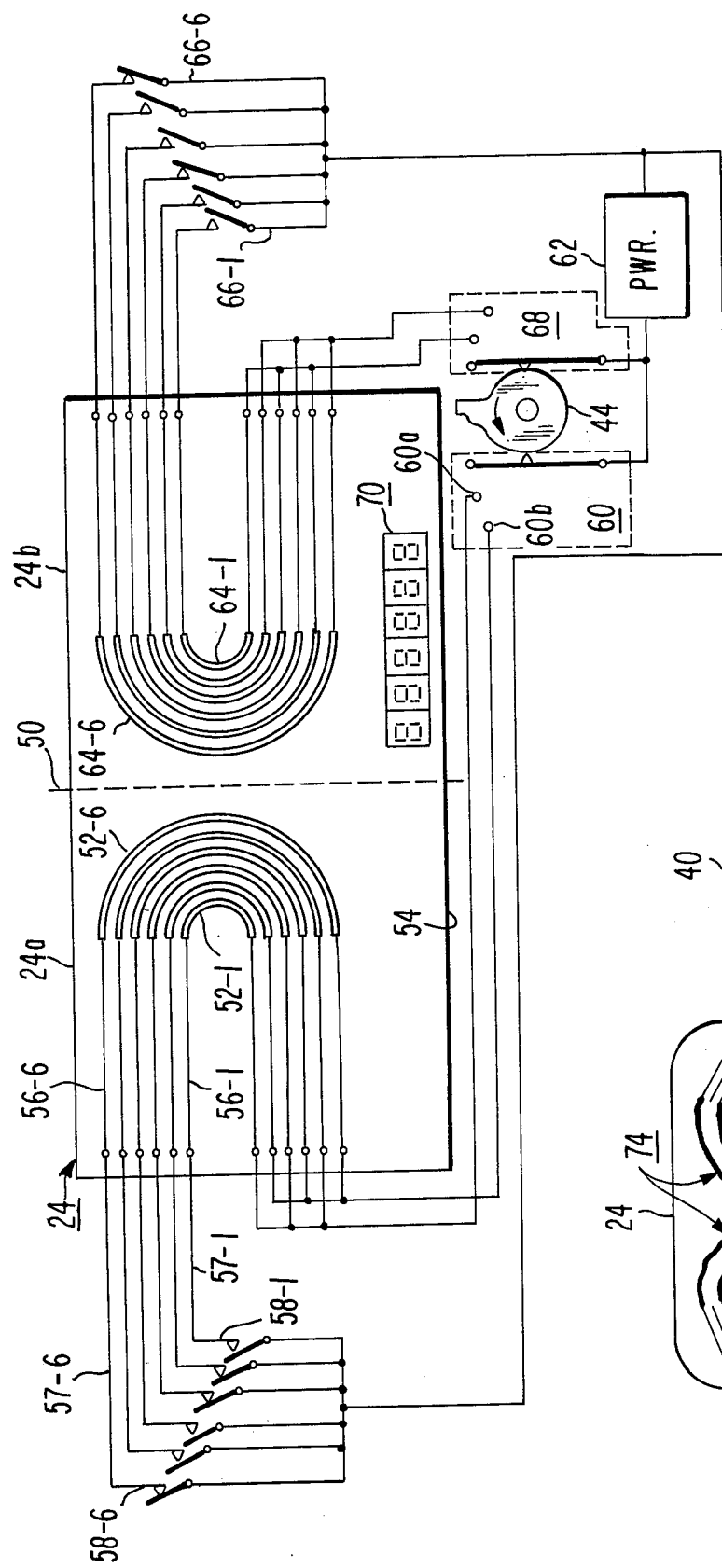
FIG. 2 is a moveable electrode assembly and electrical schematic therefore useful in practicing the embodiment of FIG. 1.

In FIG. 2 an electrode assembly 24 is illustrated which is suited for use with heat sensitive paper. Electrode assembly 24 comprises a first portion 24a to the left (as illustrated) of dashed line 50 and a second portion 24b to the right of line 50. Portion 24a includes a plurality of semicircular concentric heatable electrodes, six, 52-1 through 52-6, being illustrated by way of example. Only the inner and outer electrodes are identified to avoid complicating the figure. The electrodes will be hereinafter referenced by the numeral 52 unless a specific electrode is being described. The electrodes are located on a suitable support means 54. Portion 24b of electrode assembly 24 similarly includes semicircular electrodes 64-1 through 64-6 (hereinafter collectively referred to as electrodes 64) arranged in back-to-back (mirror image) relationship with electrodes 52-1 through 52-6. An electrode 52-n is of the same radius as an electrode 64-n where $n = 1, 2...6$. The back-to-back arrangement of electrodes illustrated in FIG. 2 permits a complete image to be produced on record medium 10 with a minimum of movement of electrode assembly 24.

One end of each of electrodes 52 is coupled via an associated non-heatable conductor 56-1 through 56-6 to a terminal at the left edge (as illustrated) of support means 54. A like plurality of flexible conductors 57-1 through 57-6 couples associated ones of conductors 56-1 through 56-6 and normally open single pole switches 58-1 through 58-6. The opposite end of each of the odd numbered semicircular electrodes (56-1, 56-3, 56-5) is coupled in common with the others to one terminal 60a of a three position switch 60 while the opposite end of each of the remaining electrodes is similarly coupled to a second terminal 60b. The common terminal of switches 58 are coupled to one terminal of a suitable power source 62 while the common terminal of switch 60 is coupled to the remaining terminal of the power source. Electrodes 64 are coupled to power source 62 via switches 66-1 through 66-6 and via switch 68 in a manner similar to that described for electrodes 52.

Electrode assembly 24 may include a plurality of additional electrodes for creating alphanumeric information on recording medium 10. Such an alphanumeric electrode assembly 70 is preferably positioned on portion 24b of electrode assembly 24. It may comprise, for example, six characters each in the form of a seven segment electrode switch assembly whereby any combination of six characters may be generated. Alternatively, electrode assembly 70 may comprise a plurality of selective dot shaped electrodes in a line. When the alternative electrode assembly is used complete characters are created by several successive lines of dots as is well known in the art. The electrode interconnections to electrode assembly 70 are not shown for simplicity of the drawing but would be similar to the electrical circuit arrangement for semicircular electrodes 52 and 64. The actual construction of an electrode assembly, such as assembly 24, is given in the aforementioned patent to Vossen et al.

Operation of the apparatus will be described by reference to FIGS. 1, 2 and 3. In FIGS. 3a, 3b and 3c electrodes 52 and 64 are illustrated in phantom while the patterns produced thereby on record medium 10 are illustrated as solid lines. Referring to FIG. 2, a desired one or more of electrodes 52 and 64 are selected by closing an associated one or more of switches 58 and 66. By way of example, switches 58-2, 58-3, 58-6, 66-3 and 66-6 are illustrated as being closed, the remaining ones being open. The switches may be manually operated, or may be electronic switches operated by some logic signals such as by command from an automatic data processing machine.

Normally if a switch 58-n (*n* being any of switches 1-6) is closed, the corresponding switch 66-n will be closed. However if only a semicircle is required at one particular radius, only switch 58-n or 66-n will be closed for that radial position. Note for example, that switch 58-2 is closed while corresponding switch 66-2 is open. Therefore electrode 52-2 will produce a semicircular image on record medium 10.

Electrode assembly 24 is assumed to be initially positioned by sector 40a of cam 40 to the position illustrated in FIG. 3a, that is, with the first group of electrodes 52 located opposite recording medium 10. Cam 44 is initially positioned as illustrated in FIG. 2, that is, such that the power switches 60 and 68 are in the position illustrated and thus disconnected from electrode assembly 24. Then drive means 42 (FIG. 1) is operated under control of controller 45 causing cam 44 (FIG. 2) to rotate to a position such that a conductive path is established from power supply 62 through terminal 60a to the addressed odd numbered ones of electrodes 52. If an associated switch 58 is closed such as for example, switch 58-3, the conductive path through the associated electrode, 52-3, is complete and the electrode 52-3 will be heated causing a semicircular pattern to be applied to recording medium 10. As drive means 42 continues to rotate cam 44, a conductive path is established from power supply 62 through terminal 60b to the addressed even numbered ones of electrodes 52 (for example, electrodes 52-2 and 52-6) causing them to be heated producing appropriate semicircular marks on recording medium 10.

It will be appreciated that the need for first activating one sub-group of electrodes 52 and then activating a second sub-group of electrodes 52 is dictated by power availability from power supply 62 and/or by overprinting problems encountered when two or more adjacent electrodes are simultaneously heated. If a larger power supply is provided, power can be supplied to all addressed ones of electrodes 52 at once if desired. For such an arrangement switches 60 and 68 need only be a two position switch for on and off. In contrast, however, if even a smaller power supply is provided or if a larger number of electrodes is provided than illustrated in FIG. 2, switches 60 and 68 it will be noted would require more positions than shown.

After all addressed ones of electrodes 52, namely electrodes 52-2, 52-3 and 52-6 have been heated, three semicircles 71 have been produced on record medium 10 as a result of actions above described. As cam 44 is being rotated to operate switch 60 cam 40 is also rotated but, due to the fixed radius of sector 40a, electrode assembly 24 remains stationary in the position illustrated in FIG. 3a. Continued rotation of cam 44 causes switch 60 to open and therefore causes power to be interrupted from power supply 62. Simultaneous continued rotation of cam 40 causes electrode assembly 24 to be moved to the position illustrated in FIG. 3b and there maintained by segment 40b such that electrodes 64 are in working relationship with record medium 10. Further rotation of cam 44 will cause power to be applied to addressed ones of electrodes 64 while simultaneous rotation of cam 40 maintains electrode assembly 24 in the position illustrated in FIG. 3b. As a result two complete circles and one semicircle will be recorded on record medium 10 as shown in FIG. 3b. Record medium advance mechanism 18 and 20 (FIG. 1) next advances the record medium such that the region containing the circles is moved away from electrode assembly 24 toward cutter station 28. During this advance motion alphanumeric electrode assembly 70 (FIG. 2) produces desired alphanumeric information as illustrated in FIG. 3c. The alphanumeric information may be produced as the record medium advances incrementally or as it advances "on the fly" depending on the speed of motion of record medium 10 and the amount of heat required to produce an image on record medium 10 and the type of alphanumeric electrode assembly utilized.

As record medium 10 is advanced by advance mechanism 18 and 20 it passes cutting station 28 which is, at an appropriate time, activated to cut off a completed label 10a containing rings 30 while the next portion of the label is under electrode assembly 24 for creation of the next label. All circular rings made by the above apparatus are continuous, not suffering from voids due to conduction of heat away from recording medium 10, by, for example, conductor 56. (FIG. 2).

Figure 4:
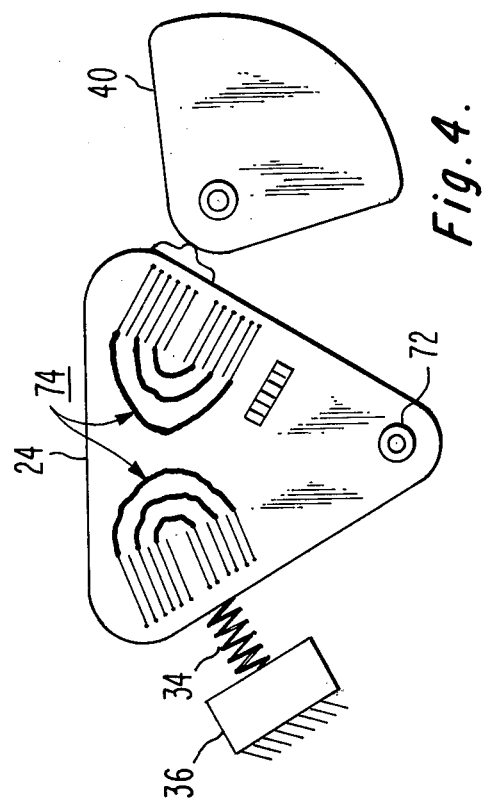
FIG. 4 is a plan view of an alternate embodiment of a portion of a label producing apparatus illustrating an apparatus for pivoting an electrode assembly.

It will be understood that the apparatus of FIG. 1 is only one exemplary embodiment. Although as shown in FIG. 1 recording medium 10 is stationary while electrode assembly 24 moves, which component of the apparatus moves relative to the other components is a matter of design choice. If electrode assembly 24 moves it may move linearly as shown in FIGS. 1 and 3. Alternatively as illustrated in FIG. 4, assembly 24 may pivot about pivotal means 72. A comparison of FIGS. 1 and 4 reveals that in the case of a pivotable electrode assembly 24, guides 32 are not needed. Further, as illustrated in FIG. 4, irregular electrode shapes 74 of any form may be chosen. In practice a slight separation may exist due to tolerance deviations of the apparatus between the two portions of what is desirably a continuous or closed image. Nevertheless the image is preferably intended to be a closed image.

What is claimed is:

1. Apparatus for forming a closed image on a record medium, said record medium being of the type that is responsive to stimulating elements of predetermined form for forming images thereon corresponding to the form of said elements, comprising in combination:
   a support means;
   means comprising a first group and a second group, each group comprising a plurality of selectable stimulating elements nested one within another, an element of the first group forming together with a corresponding element of the second group a closed image of predetermined form;
   said first group of elements being disposed on a portion of said support means and said second group of elements being disposed on another portion of said support means separated from said first portion;
   means for positioning said support means for positioning said first group of elements in working relationship relative to said medium and thereafter positioning said second group of elements in working relationship relative to said medium to effect the formation of an image on said medium corresponding to selected ones of said elements; and
   means for stimulating at least one of said corresponding elements of said first and second group while in said working relationship.

2. The combination as set forth in claim 1, wherein said record medium is responsive to heat for producing an image and wherein said stimulating elements are heated when selected.

3. The combination as set forth in claim 1, wherein said record medium is responsive to light for producing an image and wherein said stimulating elements produce light when selected.

4. The combination as set forth in claim 1, wherein said medium is responsive to an electrostatic charge for creating an image and wherein said stimulating elements produce a charge when stimulated.

5. The combination as set forth in claim 1, wherein the plurality of selectable stimulating elements in each of said two groups are in the form of concentric semicircles on a common plane on said support means and open away from one another.

6. The combination as set forth in claim 5, wherein said positioning means includes means for linearly moving said support means relative to said medium.

7. The combination as set forh in claim 5, wherein said positioning means includes means for pivotally moving said support means relative to said medium.

8. The combination as set forth in claim 1, wherein said support means comprises a third group of stimulating elements which are positioned into said working relationship with said medium when the latter of said first and second groups is positioned in said working relationship, and wherein said stimulating means also includes means for selectively stimulating elements in said third group.

9. The combination as set forth in claim 1, wherein said stimulating elements are in the form of concentric arcuate shaped elements.

10. The combination as set forth in claim 1, wherein the stimulating elements in each of said groups are divided into at least two sub-groups and wherein said stimulating means further includes means for selecting all desired elements in each sub-group serially.

* * * * *